(12) United States Patent
Iwaya

(10) Patent No.: US 11,952,096 B1
(45) Date of Patent: Apr. 9, 2024

(54) METHOD OF REUSING GAS TO ELEVATE A FLYING OBJECT AND AN AIR SAC FOR THIS PURPOSE

(71) Applicant: Iwaya Giken Inc., Sapporo (JP)

(72) Inventor: Keisuke Iwaya, Sapporo (JP)

(73) Assignee: Iwaya Giken Inc. (JP)

( * ) Notice: Subject to any disclaimer, the term of this patent is extended or adjusted under 35 U.S.C. 154(b) by 0 days.

(21) Appl. No.: 18/499,313

(22) Filed: Nov. 1, 2023

(30) Foreign Application Priority Data

Nov. 1, 2022 (JP) ................................ 2022-175724

(51) Int. Cl.
*B64B 1/58* (2006.01)
*B64F 5/40* (2017.01)

(52) U.S. Cl.
CPC . *B64B 1/58* (2013.01); *B64F 5/40* (2017.01)

(58) Field of Classification Search
CPC ..... B64B 1/58; B64B 1/62; B64B 1/64; B64F 1/36
See application file for complete search history.

(56) References Cited

U.S. PATENT DOCUMENTS

| | | | |
|---|---|---|---|
| 1,390,745 A * | 9/1921 | Armstrong | B64B 1/62 244/30 |
| 6,010,093 A | 1/2000 | Paulson | |

FOREIGN PATENT DOCUMENTS

| | | |
|---|---|---|
| CN | 106218853 A | 12/2016 |
| CN | 207227013 U | 4/2018 |
| CN | 209069346 U | 7/2019 |
| JP | S55-055096 A | 4/1980 |
| JP | H01-156197 A | 6/1989 |
| JP | H05-309225 A | 11/1993 |
| JP | 2011-042258 A | 3/2011 |
| JP | 7153408 B1 | 10/2022 |

OTHER PUBLICATIONS

Office Action issued in the corresponding Japanese Patent Application No. 2022-175724; dated Dec. 13, 2022 (total 13 pages).

* cited by examiner

*Primary Examiner* — Philip J Bonzell
(74) *Attorney, Agent, or Firm* — Harness, Dickey & Pierce, P.L.C.

(57) ABSTRACT

When lighter-than-air gas compressed and filled in a pressure-resistant container is injected into an envelope, buoyancy created in the envelope causes an aircraft to ascend. When the aircraft finishes its flight role, a lid of an opening/closing mechanism is opened to exhaust from a port lighter-than-air gas from the envelope. When the buoyancy of the envelope is insufficient to counter the weight of the aircraft, the aircraft begins to descend. The lid of the opening/closing mechanism is closed on the port, and exhaust of lighter-than-air gas from the envelope stops. After the aircraft reaches a surface of land or water, an operator connects a duct to a gas suction device. The gas suction device collects the lighter-than-air gas remaining in the air sac into a container. The lighter-than-air gas collected into the container is transported to a gas collection facility, compressed by a compressor, and filled into a pressure-resistant container.

6 Claims, 5 Drawing Sheets

METHOD OF REUSING GAS TO ELEVATE A FLYING OBJECT AND AN AIR SAC FOR THIS PURPOSE

CROSS REFERENCE TO RELATED APPLICATIONS

This application claims priority to Japanese Patent Application No. 2022-175724, filed on Nov. 1, 2022, which is expressly incorporated by reference herein it its entirety.

TECHNICAL FIELD

This invention relates to an aircraft that ascends under buoyancy of an envelope containing a gas that is lighter than air.

BACKGROUND ART

Aircraft such as gas balloons and some airships are equipped with an envelope containing a gas that is lighter than air (hereinafter referred to as "lighter-than-air gas"), and ascend under buoyancy of the envelope.

For example, JP7153408B describes a technique for reducing an altitude of an aircraft that ascends under buoyancy of an envelope containing a lighter-than-air gas. In the aircraft described in JP7153408B, when a cable of a pulley attached to an upper inner surface of the envelope is pulled downward, a bottom of the envelope is pulled upward to a top of the envelope, causing lighter-than-air gas contained in the envelope to be expelled through an opening in the bottom of the envelope. As a result, an altitude of the aircraft described in JP7153408B can be rapidly reduced.

In terms of buoyancy, hydrogen is the most suitable lighter-than-air gas for use in an envelope of a lighter-than-air aircraft. However, if oxygen becomes mixed with the hydrogen contained in the envelope and the gas contained in the envelope is exposed to an ignition source the gas will explode.

Helium is inferior to hydrogen in terms of buoyancy, but is superior to hydrogen in terms of safety, and thus is widely used as a lighter-than-air gas in an envelope of a lighter-than-air aircraft. However, there is a finite amount of helium available on earth, and helium is more expensive to use than hydrogen.

In view of the above circumstances, an object of this invention is to reduce a cost of lighter-than-air gas used to elevate an aircraft.

SUMMARY

The present invention includes, as a first aspect, a method of reusing a lighter-than-air gas used for an aircraft that ascends under buoyancy generated by the lighter-than-air gas contained in an envelope of the aircraft, comprising: a step of exhausting while the aircraft is in flight a portion of the lighter-than-air gas contained in the envelope and causing the aircraft to descend, a step of collecting into a gas-collection container at least a portion of the lighter-than-air gas contained in the envelope by use of a gas suction device after the aircraft reaches a land or water surface, a step of transporting the gas-collection container that contains the lighter-than-air gas collected from the envelope to a location where a compressor is provided, a step of compressing by the compressor at least a portion of the lighter-than-air gas contained in the gas-collection container and filling a pressure-resistant container with the lighter-than-air gas compressed by the compressor, and a step of injecting at least a portion of the lighter-than-air gas from the pressure-resistant container into the envelope of the aircraft or into an envelope of another aircraft.

According to the method of the first aspect, at least a portion of the lighter-than-air gas is reused, thus reducing an overall cost of procuring the lighter-than-air gas. Moreover, according to the method of the first aspect, there is no need to transport the compressor to a location on the land or water surface reached by the aircraft.

The present invention includes, as a second aspect, a method of reusing a lighter-than-air gas used for an aircraft that ascends under buoyancy generated by the lighter-than-air gas contained in an envelope of the aircraft, comprising: a step of exhausting while the aircraft is in flight a portion of the lighter-than-air gas contained in the envelope and causing the aircraft to descend, a step of collecting into a gas-collection container at least a portion of the lighter-than-air gas contained in the envelope by use of a gas suction device after the aircraft reaches a land or water surface, a step of transporting the gas-collection container that contains the lighter-than-air gas collected from the envelope to a location where a liquefier is provided, a step of liquefying by the liquefier at least a portion of the lighter-than-air gas contained in the gas-collection container and filling a storage tank with the lighter-than-air gas liquefied by the liquefier, and a step of injecting at least a portion of the lighter-than-air gas from the storage tank into the envelope of the aircraft or into an envelope of another aircraft.

According to the method of the second aspect, at least a portion of lighter-than-air gas is reused, thus reducing an overall cost incurred in procuring a lighter-than-air gas. Moreover, according to the method of the second aspect, there is no need to transport the liquefier to the location on the land or water surface reached by the aircraft.

The present invention includes, as a third aspect, the method of the first or second aspect, comprising: a step of an operator moving in a vehicle to find the aircraft at a position on a land or water surface reached by the aircraft, a step of the operator moving in the vehicle to the position reached by the aircraft, and a step of the operator connecting the envelope of the aircraft via a gas transfer path to the gas-collection container carried by the vehicle at the position on the land or water surface reached by the aircraft.

According to the method of the third aspect, there is no need to transport the envelope containing the lighter-than-air gas from the position on the land or water surface reached by the aircraft.

The present invention includes, as a fourth aspect, the method of the third aspect comprising: a step of estimating the position on the land or water surface reached by the aircraft, and a step of the operator moving in the vehicle to the position estimated in the estimating step, wherein the operator performs the finding step after moving to the position estimated in the estimating step.

According to the method of the fourth aspect, the lighter-than-air gas contained in the envelope is promptly collected into the gas-collection container after the aircraft reaches the land or water surface, and a risk is minimized of the lighter-than-air gas leaking from the envelope before the lighter-than-air gas is collected into the gas-collection container.

DETAILED DESCRIPTION

Exemplary Embodiment

Figure 1:
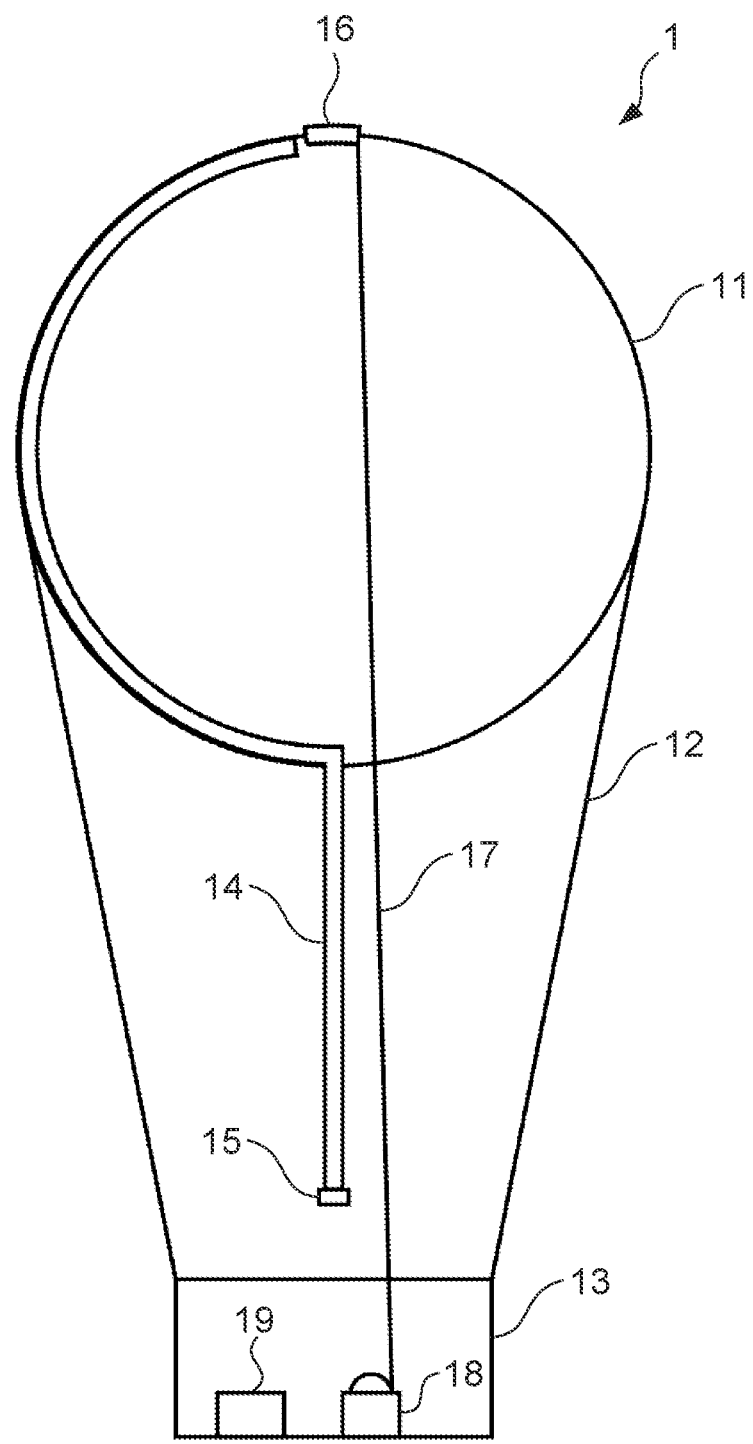
FIG. 1 shows an appearance of an aircraft according to an exemplary embodiment of the present invention.

FIG. 1 shows an appearance of Aircraft 1 according to an exemplary embodiment of the present invention. Aircraft 1 is a gas balloon. Aircraft 1 comprises Envelope 11, Suspension Ropes 12, Container 13, Duct 14, Connector 15, Opening/Closing Mechanism 16, Control Cable 17, Winch 18 and Control Unit 19.

Envelope 11 is a bag for containing lighter-than-air gas, i.e., a gas that is lighter than air. Envelope 11 generates buoyancy to elevate Aircraft 1.

Suspension Ropes 12 are ropes that extend downward from the outer surface of Envelope 11. Suspension Ropes 12 serve to lift Container 13, which is connected to the lower ends of Suspension Ropes 12.

Container 13 is a box-shaped body that forms a space for housing objects and people (not shown) for transport by Aircraft 1, in addition to Winch 18 and Control Unit 19.

Duct 14 is a tubular body that extends downwards from near the top on the inner surface of Envelope 11 to the outside of Envelope 11 through an opening near the bottom of Envelope 11. The upper end of Duct 14 opens into Envelope 11.

Connector 15 is a connector attached to the lower end of Duct 14 for connection to an end of a tubular body that is connected to a device such as a gas suction device or a pressure-resistant container as described below. Connector 15 closes the opening at the bottom end of Duct 14 when it is not connected to a connecting partner. Connector 15 does not close the opening at the bottom end of Duct 14 when it is connected to the connecting partner, but interconnects passageways in Duct 14 and the connected tubular body.

Opening/Closing Mechanism 16 is a mechanism for opening and closing a port disposed in Envelope 11. The upper end of Control Cable 17 is connected to Opening/Closing Mechanism 16. When Opening/Closing Mechanism 16 is subject to a downward force by Control Cable 17, a lid of Opening/Closing Mechanism 16 is moved from a closed state to an open state and opens the port. As a result, lighter-than-air gas contained in Envelope 11 is discharged from Envelope 11 via the port. When the downward force from Control Cable 17 is released, the lid of the Opening/Closing Mechanism 16 moves from the open state to the closed state and closes the port. As a result, discharge of lighter-than-air gas from Envelope 11 is stopped.

Control Cable 17 is a cable used for opening and closing the lid of Opening/Closing Mechanism 16. The upper end of Control Cable 17 is connected to Opening/Closing Mechanism 16, and the lower end of Control Cable 17 is connected to Winch 18. A portion of the lower end of Control Cable 17 is wound and unwound by Winch 18.

Winch 18 is a device that winds and unwinds Control Cable 17. When Winch 18 winds Control Cable 17, Control Cable 17 exerts a downward force on Opening/Closing Mechanism 16, causing the lid of Opening/Closing Mechanism 16 to move from a closed state to an open state and opens the port of Envelope 11. When Winch 18 unwinds Control Cable 17, the downward force exerted by Control Cable 17 on Opening/Closing Mechanism 16 is released, and the lid of Opening/Closing Mechanism 16 moves from the open state to the closed state and closes the port of Envelope 11.

Control Unit 19 controls operations of Winch 18, and may be equipped with, for example, a communication interface for wireless communication with ground-based communication devices, and an altimeter for measuring an altitude of Aircraft 1. Control Unit 19 may also control devices housed in Container 13, and devices (not illustrated in FIG. 1) with which Aircraft 1 is equipped.

In this embodiment, after Aircraft 1 completes its flight, reaches a land or water surface, and lighter-than-air gas contained in Envelope 11 is collected and reused. FIGS. 2(A)-2(F) show Aircraft 1 ascending and descending, and lighter-than-air gas being collected from Envelope 11. FIG. 3 shows a flow of procedures for ascent and descent of Aircraft 1 and collection of lighter-than-air gas from Aircraft 1. Following is a description of the procedures for ascent, descent, and lighter-than-air gas recovery from Aircraft 1, with reference to FIGS. 2(A)-2(F) and 3.

First, Operator X connects Connector 15 of landed Aircraft 1 to the end of the tubular body connected to Pressure-resistant Container B1 filled with lighter-than-air gas. Then, Operator X opens an open/close valve of Pressure-resistant Container B1 (FIG. 2(A)). As a result, lighter-than-air gas is injected from Pressure-resistant Container B1 into Envelope 11 via Duct 14 (Step S101 in FIG. 3).

Figure 2:
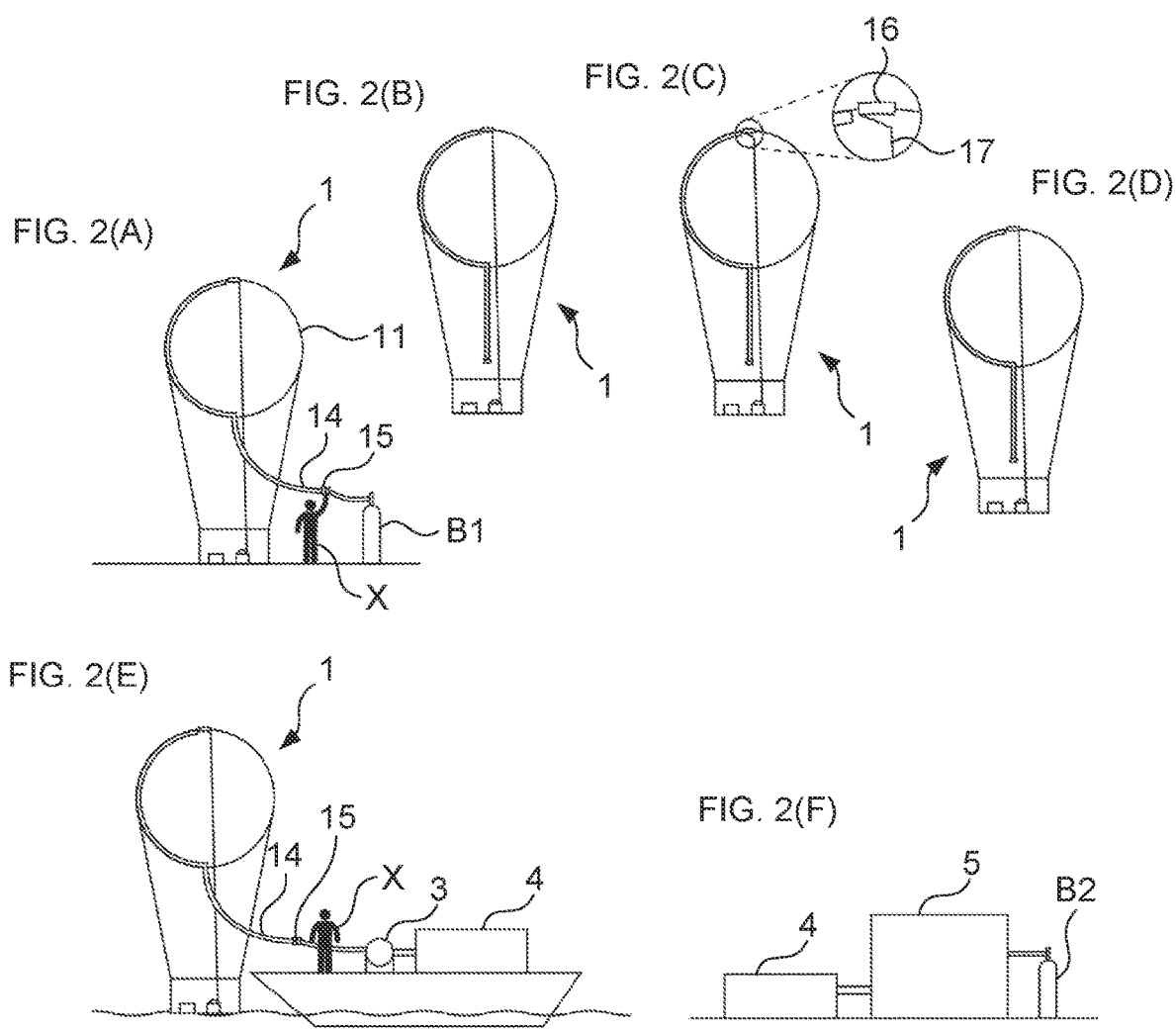
FIGS. 2(A)-2(f) show the aircraft ascending and descending, and lighter-than-air gas being collected from the envelope of the aircraft.
Figure 3:
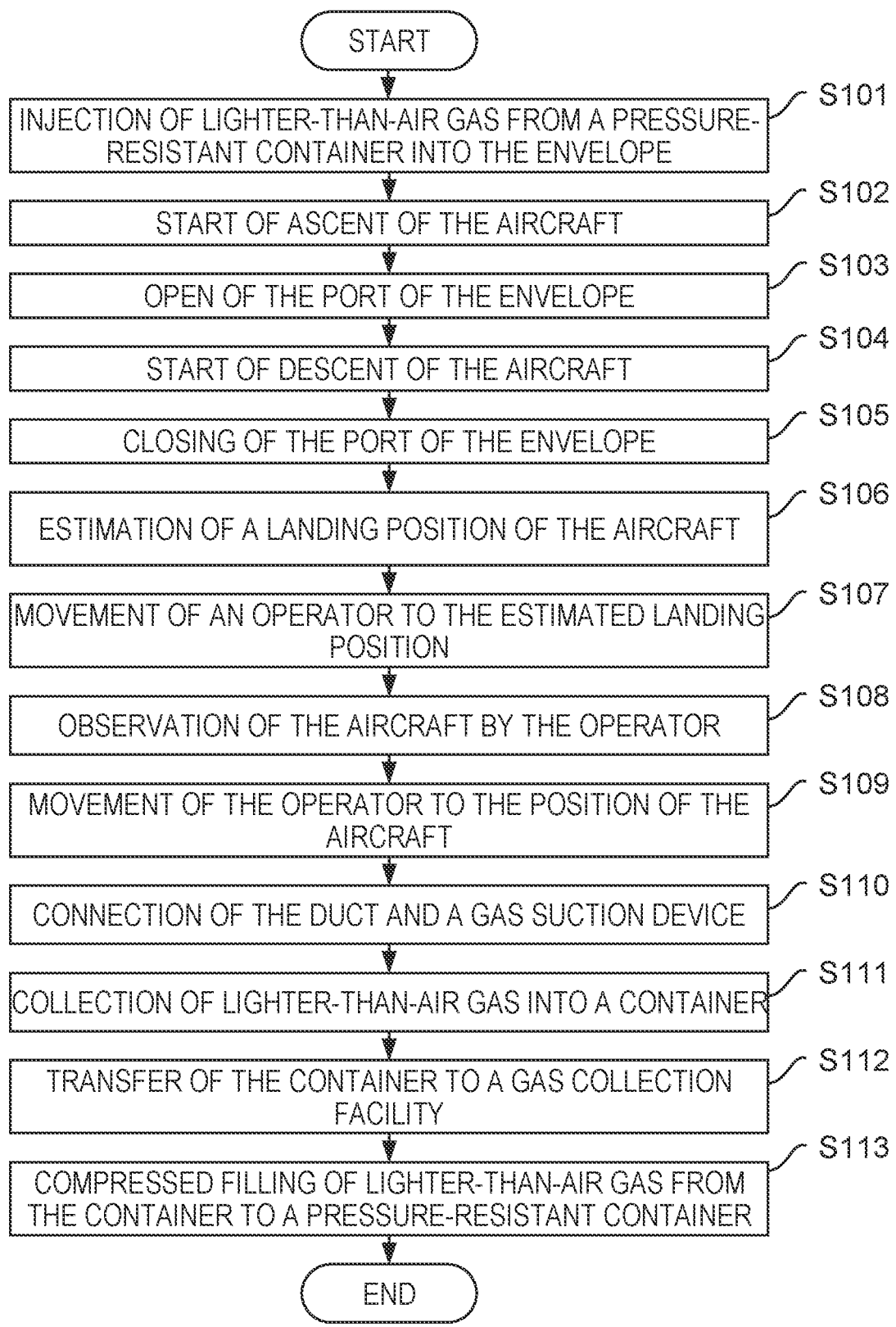
FIG. 3 shows a flow of procedures for ascent and descent of the aircraft and collection of the lighter-than-air gas from the aircraft.

When enough lighter-than-air gas is injected into Envelope 11 and Envelope 11 has sufficient buoyancy to counter a weight of Aircraft 1, Aircraft 1 begins to ascend (FIG. 2(B) and step S102 in FIG. 3).

After Aircraft 1 completes a flight role, Operator X operates a communication device on the ground and provides a wireless instruction to Control Unit 19 to open the port of Aircraft 1 while airborne. Control Unit 19 controls Winch 18 to wind Control Cable 17 in accordance with the instruction received from the communication device on the ground. As a result, the lid of Opening/Closing Mechanism 16 opens the port in Envelope 11 (FIG. 2(C) and step S103 in FIG. 3), and lighter-than-air gas exhaust from Envelope 11 is initiated.

When a buoyancy of Envelope 11 becomes insufficient to counter the weight of Aircraft 1 due to the exhaust of lighter-than-air gas from Envelope 11, Aircraft 1 starts to descend (step S104 in FIG. 3).

An altitude of Aircraft 1 is continuously notified via the communication device by Control Unit 19. Thus, Operator X is able to determine a current altitude of Aircraft 1. When Operator X confirms that descent of Aircraft 1 has started, he/she operates the communication device and instructs Control Unit 19 to close the port. Control Unit 19 controls Winch 18 to unwind Control Cable 17 in accordance with the instruction received wirelessly from the communication device on the ground. As a result, the lid of Opening/Closing Mechanism 16 moves and closes the port in Envelope 11 (FIG. 2(D) and step S105 in FIG. 3). In this state, Aircraft 1 continues its descent.

Then, estimation of a landing position of Aircraft 1 on a land or water surface is performed (step S106 in FIG. 3).

Methods for estimating a landing position of Aircraft 1 include, but are not limited to, a method of estimating the position based on an altitude at which Aircraft 1 is flying, a wind direction and a wind speed at the flight altitude, a method of estimating the landing position based on a strength of radio waves transmitted from Control Unit 19, and a method of estimating the landing position based on position information (e.g., latitude and longitude) transmitted from Control Unit 19. Estimation of the landing position of Aircraft 1 on a land or water surface may be performed, for example, by a communication device or other device used by Operator X.

Then, Operator X moves to the estimated landing position of Aircraft 1 on a land or water surface by way of vehicle (step S107 in FIG. 3). In the following description, Aircraft 1 lands on a water surface.

When Operator X arrives by Ship 2 at the position where Aircraft 1 is estimated to land on the water surface (an example of a vehicle), he/she observes descent of Aircraft 1 (step S108 in FIG. 3). Then, Operator X by way of Ship 2 moves to the position at which Aircraft 1 has reached the water surface (step S109 in FIG. 3).

Next, Operator X retrieves Duct 14 of Aircraft 1 from the water surface, and connects Connector 15 at the end of Duct 14 to the tubular body connected to Gas Suction Device 3 on Ship 2 (FIG. 2(E) and step S110 in FIG. 3). Gas Suction Device 3 is connected to Container 4 mounted on Ship 2 via the tubular body. Container 4 is a container for collecting lighter-than-air gas.

Then, Operator X performs an operation to start Gas Suction Device 3 (e.g., an operation to power-on Gas Suction Device 3). In response to the operation, Gas Suction Device 3 starts to suction lighter-than-air gas from Envelope 11 through Duct 14 and to send the suctioned gas to Container 4. As a result, the lighter-than-air gas contained in Envelope 11 is collected in Container 4 (step S111 in FIG. 3).

When almost all of the lighter-than-air gas has been suctioned from Envelope 11 into Container 4, Operator X performs an operation to stop Gas Suction Device 3 (e.g., an operation to power-off Gas Suction Device 3). Operator X then disconnects the connector at the end of the tubular body connected to Gas Suction Device 3 and Connector 15 at the end of Duct 14. After Operator X moves to land by way of Ship 2, he/she removes Container 4 from Gas Suction Device 3 and transfers Container 4 from Ship 2 to a land vehicle and transports Container 4 to a gas collection facility (step S112 in FIG. 3).

Operator X then unloads Container 4 from the land vehicle, connects Container 4 to Compressor 5 located in the gas collection facility via a tubular body (FIG. 2(F)). Then, Operator X performs an operation to start Compressor 5 (e.g., an operation to power-on Compressor 5).

Compressor 5 is connected to Pressure-resistant Container B2. Pressure-resistant Container B2 may be Pressure-resistant Container B1 or a pressure-resistant container other than Pressure-resistant Container B1.

When Compressor 5 starts in response to the operation made by Operator X, lighter-than-air gas contained in Container 4 is compressed by Compressor 5 and filled into Pressure-resistant Container B2 (step S113 in FIG. 3).

In addition to compressing lighter-than-air gas and filling pressure-resistant Container B2 with lighter-than-air gas, Compressor 5 may also remove dust, dirt, etc. from the lighter-than-air gas suctioned from Container 4 by, for example, filtering. Moreover, Compressor 5 may separate and remove gases other than the lighter-than-air gas from the gas suctioned from Container 4. Methods for separating lighter-than-air gas and gases other than lighter-than-air gas contained in the gas suctioned from Container 4 by Compressor 5 include, but are not limited to, a deep-cooling separation method, an adsorption separation method, and a membrane separation method.

When almost all the lighter-than-air gas in Container 4 has been filled into Pressure-resistant Container B2, Operator X performs an operation to stop Compressor 5 (e.g., an operation to power-off Compressor 5). The foregoing is a description of the procedures for ascent and descent of Aircraft 1, and for collection lighter-than-air gas from Aircraft 1.

As described above, lighter-than-air gas collected in Pressure-resistant Container B2 is injected into Envelope 11 of Aircraft 1 or an envelope of an aircraft other than Aircraft 1 for reuse in flight.

According to the embodiment described above, at least a part of lighter-than-air gas used to elevate an aircraft is collected and reused. As a result, an overall cost of lighter-than-air gas incurred for flight of aircraft is reduced.

[Modifications]

The above-described embodiment may be modified in various ways. Following are examples of modifications of the above-described embodiment. Two or more of the above-described embodiments and the following modifications may be combined.

(1) The mechanism and method of exhausting lighter-than-air gas from Envelope 11 for the descent of Aircraft 1 is not limited to those in the embodiment. For example, when a pilot is present in Container 13, the lid of Opening/Closing Mechanism 16 may be opened and closed by the pilot manually pulling Control Cable 17 instead of Winch 18. Instead of the lid of Opening/Closing Mechanism 16 being opened and closed by Control Cable 17, the lid may be opened and closed by, for example, a motor or actuator operating under control of Control Unit 19.

Figure 4:
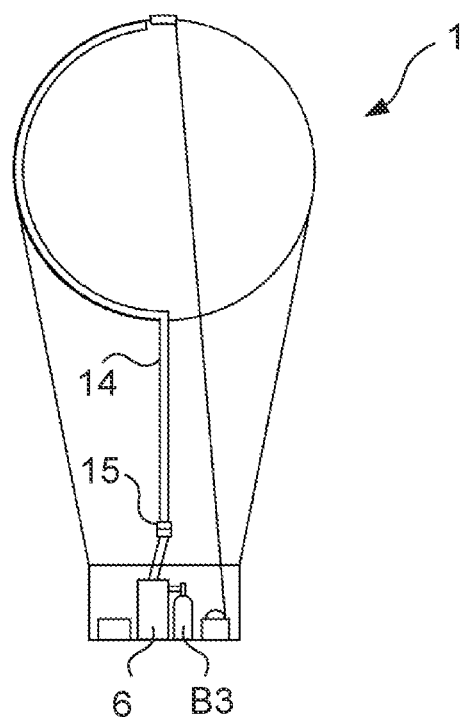
FIG. 4 shows a compressor and a pressure-resistant container mounted on an aircraft according to a modification of the exemplary embodiment.

Lighter-than-air gas exhausted from Envelope 11 may be compressed and collected in a pressure-resistant container provided onboard Aircraft 1 instead of being released into the atmosphere. FIG. 4 shows Compressor 6 and Pressure-resistant Container B3 mounted on Aircraft 1 according to a modification of the embodiment. While Aircraft 1 is in flight, Connector 15 at the end of Duct 14 is connected to the end of the tubular body connected to Compressor 6. Compressor 6 is connected to Pressure-resistant Container B3. When Compressor 6 starts operation under control of Control Unit 19, it suctions lighter-than-air gas contained in Envelope 11 via Duct 14, compresses it, and then fills Pressure-resistant Container B3 with the lighter-than-air gas. As a result, buoyancy generated by Envelope 11 decreases and Aircraft 1 begins to descend. Compressor 6 then stops operation under control of Control Unit 19, after which Aircraft 1 keeps descending.

In this modification, after Aircraft 1 reaches a land or water surface, Compressor 6 may compress lighter-than-air gas remaining in Envelope 11 and fill Pressure-resistant Container B3 with the lighter-than-air gas. In this case, Gas Suction Device 3, Container 4, and Compressor 5 are not required.

(2) In the embodiment described above, lighter-than-air gas contained in Envelope 11 of Aircraft 1 that has reached a land or water surface is collected in Container 4 and then compressed by Compressor 6 into Pressure-resistant Container B2, and injected from Pressure-resistant Container B2 into Envelope 11 of Aircraft 1 or an envelope of an aircraft other than Aircraft 1. Procedures other than those illustrated in the embodiments described above may be employed, as long as at least a portion of lighter-than-air gas contained in Envelope 11 of Aircraft 1 after reaching a land or water surface is collected and injected into Envelope 11 of Aircraft 1 or an envelope of an aircraft other than Aircraft 1 for reuse.

For example, at least some of lighter-than-air gas contained in Envelope 11 of Aircraft 1 after landing on the ground or the water surface may be collected in Container 4 and then injected from Container 4 into Envelope 11 of Aircraft 1 or an envelope of an aircraft other than Aircraft 1 for reuse.

Lighter-than-air gas contained in Envelope 11 may also be compressed and filled into Pressure-resistant Container B2 without going through Container 4. In this case, Pressure-resistant Container B2 serves as the container for collecting gas.

Figure 5:
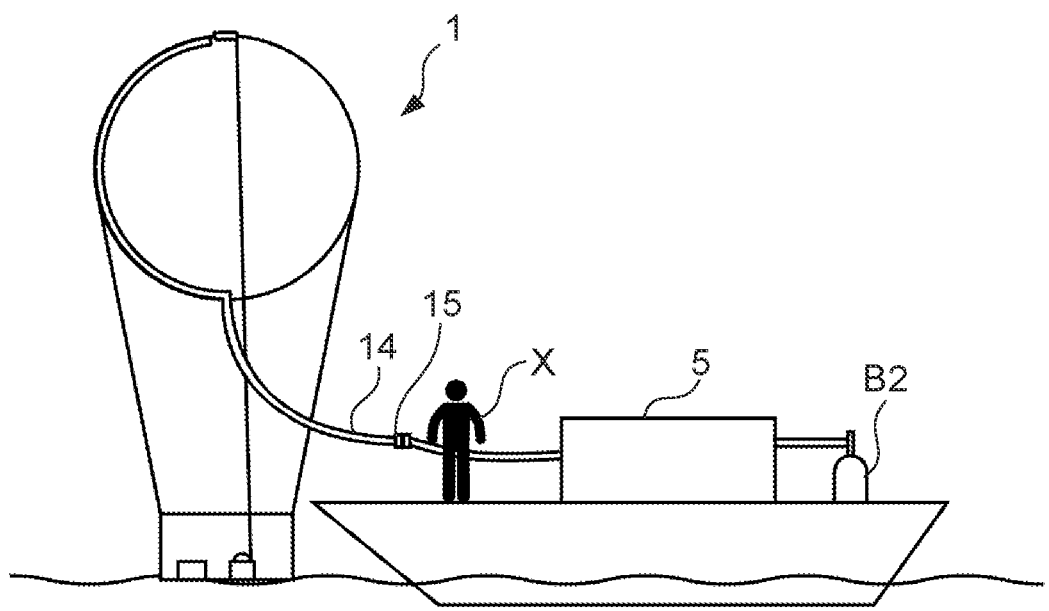
FIG. 5 shows equipment mounted on a ship according to a modification of the exemplary embodiment.

FIG. 5 shows equipment mounted on Ship 2 according to a modification of the embodiment. In this modification, Ship 2 is equipped with Compressor 5 and Pressure-resistant Container B2 instead of Gas Suction Device 3 and Container 4. In this case, Operator X retrieves Duct 14 of Aircraft 1, which has reached a water surface, connects Connector 15 at the end of Duct 14 with the connector at the end of the tubular body connected to Compressor 5, and performs an operation to start Compressor 5. As a result, lighter-than-air gas contained in Envelope 11 is suctioned into Compressor 5 via Duct 14, compressed, and then filled into Pressure-resistant Container B2.

(3) In the embodiment described above, injection of lighter-than-air gas into an envelope of an aircraft is performed from a pressure-resistant container, but is not limited thereto. For example, as described in the modification (2) above, lighter-than-air gas may be injected into the envelope from Container 4, or the like, which contains lighter-than-air gas at ambient pressure.

The pressure-resistant container used for injection of lighter-than-air gas into the envelope can be of any size. A small pressure-resistant container referred to as a cylinder may be used, or a large pressure-resistant container referred to as a tank may be used.

(4) In the above mentioned embodiment, lighter-than-air gas is compressed and then filled into a pressure-resistant container, thereby reducing a space required for storing lighter-than-air gas. Alternatively, lighter-than-air gas may be liquefied and contained in a storage tank. For example, at least a portion of lighter-than-air gas contained in Envelope 11 of Aircraft 1 after reaching a land or water surface may be liquefied by a liquefier and then contained in a storage tank of a cooling tank truck, and transported to a storage location.

(5) In the embodiment described above, injection of lighter-than-air gas into Envelope 11 and collection of lighter-than-air gas from Envelope 11 are performed via Duct 14. Alternatively, injection of lighter-than-air gas into Envelope 11 and collection of lighter-than-air gas from Envelope 11 may be performed via a vent in Envelope 11 without going through Duct 14.

Figure 6:
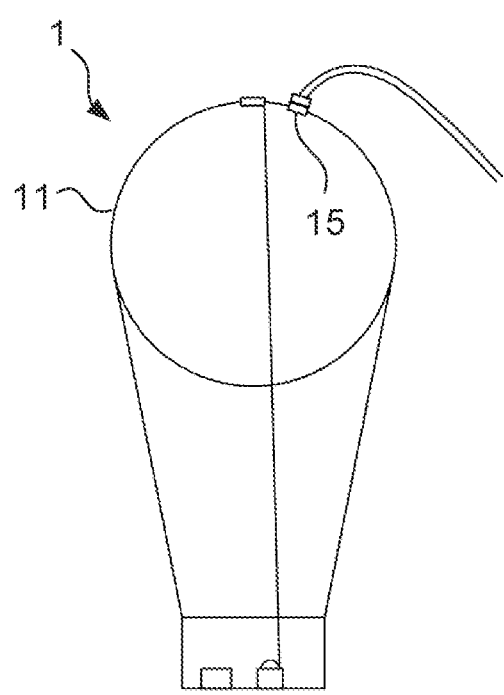
FIG. 6 shows an appearance of an aircraft according to a modification of the exemplary embodiment.

FIG. 6 shows an appearance of Aircraft 1 according to this modification of the embodiment. In this modification, Aircraft 1 is not equipped with Duct 14, and Connector 15 is attached to a vent in Envelope 11. In this case, injection of lighter-than-air gas into Envelope 11 is performed by connecting the connector at the end of the tubular body connected to Pressure-resistant Container B1 to Connector 15 on Envelope 11. Collection of lighter-than-air gas from Envelope 11 is performed by connecting the connector at the end of the tubular body connected to Container 4 to Connector 15 on Envelope 11.

(6) In the embodiment described above, injection of lighter-than-air gas into Envelope 11 and collection of lighter-than-air gas from Envelope 11 are both performed via Duct 14. Injection of lighter-than-air gas into Envelope 11 and collection of lighter-than-air gas from Envelope 11 may be performed via different gas transfer pathways. For example, injection of lighter-than-air gas into Envelope 11 may be performed via Duct 14, and collection of lighter-than-air gas from Envelope 11 may be performed via a vent provided in Envelope 11, as employed in the modification (5) described above.

(7) In the embodiment described above, injection of lighter-than-air gas into Envelope 11 and collection of lighter-than-air gas from Envelope 11 are performed via a single gas transfer path, but they may be performed via multiple gas transfer paths. For example, Aircraft 1 may have multiple Ducts 14 through which lighter-than-air gas may be injected into Envelope 11, and lighter-than-air gas may be recovered from Envelope 11.

(8) In the embodiment described above, Aircraft 1 ascends from the ground, but Aircraft 1 may ascend from a surface of water. Similarly, in the embodiment described above, Aircraft 1 lands on a surface of water surface, however, Aircraft 1 may land a surface of land.

(9) A type of vehicle used to transport Operator X and Container 4, etc. is not limited to a water vehicle such as a ship, and may be a land vehicle such as a truck and a train, or an aerial vehicle such as an airplane.

(10) Aircraft 1 need not be equipped with Connector 15. If Aircraft 1 is not equipped with Connector 15, the connection between Duct 14 and Container 4 or the like, may be made, for example, by inserting the tubular body connected to Container 4 or the like into the lower end portion of Duct 14 and tying the tubular body from outside Duct 14 with a tying member such as a rope.

(11) There may be more than one Operator X. For example, Operator X responsible for injecting lighter-than-air gas into Envelope 11 and Operator X responsible for collecting lighter-than-air gas from Envelope 11 may be different operators.

The invention claimed is:

1. A method of reusing a lighter-than-air gas used for an aircraft that ascends under buoyancy generated by the lighter-than-air gas contained in an envelope of the aircraft, comprising:
    a step of exhausting while the aircraft is in flight a portion of the lighter-than-air gas contained in the envelope and causing the aircraft to descend,
    a step of collecting into a gas-collection container at least a portion of the lighter-than-air gas contained in the envelope by use of a gas suction device after the aircraft reaches a land or water surface,
    a step of transporting the gas-collection container that contains the lighter-than-air gas collected from the envelope to a location where a compressor is provided,
    a step of compressing by the compressor at least a portion of the lighter-than-air gas contained in the gas-collection container and filling a pressure-resistant container with the lighter-than-air gas compressed by the compressor, and a step of injecting at least a portion of the lighter-than-air gas from the pressure-resistant container into the envelope of the aircraft or into an envelope of another aircraft.

2. The method according to claim 1, comprising:

a step of an operator moving in a vehicle to find the aircraft at a position on a land or water surface reached by the aircraft, a step of the operator moving in the vehicle to the position reached by the aircraft, and a step of the operator connecting the envelope of the aircraft via a gas transfer path to the gas-collection container carried by the vehicle at the position on the land or water surface reached by the aircraft.

3. The method according to claim 2, comprising:

a step of estimating the position on the land or water surface reached by the aircraft, and a step of the operator moving in the vehicle to the position estimated in the estimating step, wherein the operator performs the finding step after moving to the position estimated in the estimating step.

4. A method of reusing a lighter-than-air gas used for an aircraft that ascends under buoyancy generated by the lighter-than-air gas contained in an envelope of the aircraft, comprising:

a step of exhausting while the aircraft is in flight a portion of the lighter-than-air gas contained in the envelope and causing the aircraft to descend, a step of collecting into a gas-collection container at least a portion of the lighter-than-air gas contained in the envelope by use of a gas suction device after the aircraft reaches a land or water surface, a step of transporting the gas-collection container that contains the lighter-than-air gas collected from the envelope to a location where a liquefier is provided, a step of liquefying by the liquefier at least a portion of the lighter-than-air gas contained in the gas-collection container and filling a storage tank with the lighter-than-air gas liquefied by the liquefier, and a step of injecting at least a portion of the lighter-than-air gas from the storage tank into the envelope of the aircraft or into an envelope of another aircraft.

5. The method according to claim 4, comprising:

a step of an operator moving in a vehicle to find the aircraft at a position on a land or water surface reached by the aircraft, a step of the operator moving in the vehicle to the position reached by the aircraft, and a step of the operator connecting the envelope of the aircraft via a gas transfer path to the gas-collection container carried by the vehicle at the position on the land or water surface reached by the aircraft.

6. The method according to claim 5, comprising:

a step of estimating the position on the land or water surface reached by the aircraft, and a step of the operator moving in the vehicle to the position estimated in the estimating step, wherein the operator performs the finding step after moving to the position estimated in the estimating step.

* * * * *